(12) United States Patent
Tardif (10) Patent No.: US 7,388,618 B2
(45) Date of Patent: Jun. 17, 2008

(54) VIDEO SYNCHRONIZATION BY ADJUSTING VIDEO PARAMETERS

(75) Inventor: John A. Tardif, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 10/897,278

(22) Filed: Jul. 22, 2004

(65) Prior Publication Data

US 2006/0017847 A1    Jan. 26, 2006

(51) Int. Cl.
  *H04N 9/475* (2006.01)
(52) U.S. Cl. ...................................................... 348/515
(58) Field of Classification Search ................ 348/537, 348/515, 513, 512, 543, 544, 536; 375/376, 375/375; 331/16; 704/278
  See application file for complete search history.

(56) References Cited

U.S. PATENT DOCUMENTS

| | | | |
|---|---|---|---|
| 5,229,853 A | | 7/1993 | Myers |
| 5,821,818 A | | 10/1998 | Idei et al. |
| 5,825,431 A | * | 10/1998 | Walker ........................ 348/536 |
| 5,995,570 A | | 11/1999 | Onvural et al. |
| 6,049,769 A | * | 4/2000 | Holmes et al. .............. 704/278 |
| 6,317,161 B1 | * | 11/2001 | Renner et al. .............. 348/536 |
| 6,385,267 B1 | * | 5/2002 | Bowen et al. .............. 375/376 |
| 6,670,994 B2 | | 12/2003 | Voltz et al. |
| 2005/0248596 A1 | * | 11/2005 | Smith et al. ................ 345/698 |

OTHER PUBLICATIONS

"PC Video Synchronization and Playback," www.microsoft.com/whdc/archive/VidSynch.mspx, Dec. 4, 2001.
Montrym, et al., "InfiniteReality: A Real-Time Graphics System," Silicon Graphics Computer Systems.
Bishop, et al., "Adaptive Phase Locked Loop for Video Signal Sampling," pp. 1664-1667, 1992 IEEE.
Pejhan, et al., "Dynamic Frame rate Control for Video Streams," pp. 141-144, , 1999 ACM Multimedia, Orlando, FL, USA.
Jones, et al., "Handling Audio and Video Streams in a Distributed Environment," pp. 231-243, 1993 ACM, N.C., USA.

* cited by examiner

*Primary Examiner*—Paulos M Natnael
(74) *Attorney, Agent, or Firm*—Vierra Magen Marcus & DeNiro LLP

(57) ABSTRACT

When playing back audio/video streams, many playback devices try to recreate the audio and video clocks used for encoding. One means typically employed to recreate such clocks includes the use of a Phased Locked Loop (PLL) circuit. The audio and video should remain synchronized. However, many reasonable cost PLLs cannot recreate the exact video clock used for encoding. The synchronization of the video to the audio can be resolved by adjusting one or more of the dimensions (or other variables) that define the video being recreated. Changing the dimensions (or other variables) of the video allows for an adjustment of the output frequency of the PLL to a value that can be implemented.

39 Claims, 8 Drawing Sheets

VIDEO SYNCHRONIZATION BY ADJUSTING VIDEO PARAMETERS

BACKGROUND OF THE INVENTION

1. Field of the Invention

The present invention relates to synchronizing video.

2. Description of the Related Art

When playing back audio/video streams, many playback devices try to recreate the audio and video clocks used for encoding. One means employed to recreate such clocks includes the use of a Phased Locked Loop (PLL) circuit.

Figure 1:
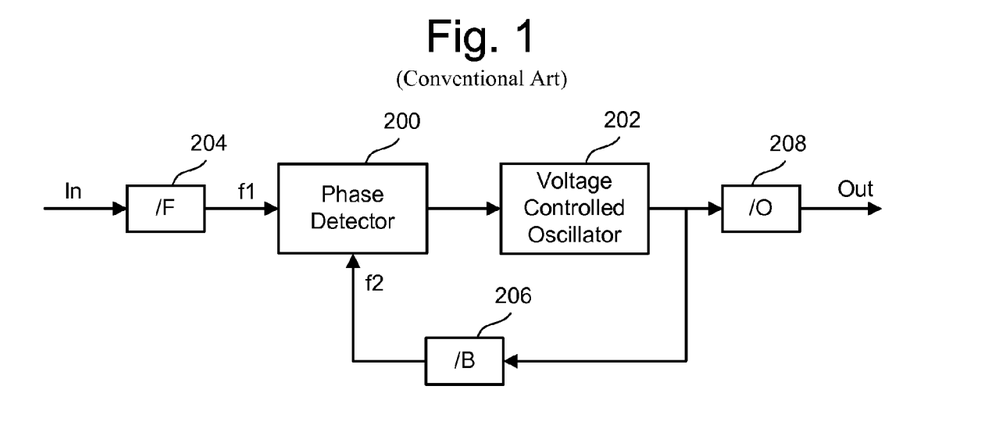
FIG. 1 is a block diagram of a phase locked loop circuit.

The classic PLL includes a Phase Detector and a Voltage Controlled Oscillator (VCO). FIG. 1 provides an example of a PLL that includes Phase Detector 200 connected to VCO 202. Phase Detector 200 is a device that compares two input frequencies (f1 and f2) and generates an output that is a measure of their phase difference. If the frequency f1 differs from f2, the error signal from Phase Detector 200 causes the frequency of VCO 202 to deviate in the direction of f1. The PLL of FIG. 1 also includes dividers 204, 206 and 208. The input signal (In) is first sent to divider 204, where its frequency is divided by F. The output of divider 204 is provided to Phase Detector 200. The output of the VCO 202 is provided to divider 208, which divides the output frequency of VCO 202 by O. The output of divider 208 is the output (Out) of the PLL. The output of VCO 202 is also sent to divider 206, which divides the output frequency of VCO 202 by B. The output of divider 206 is the second input to Phase Detector 200.

Figure 2:
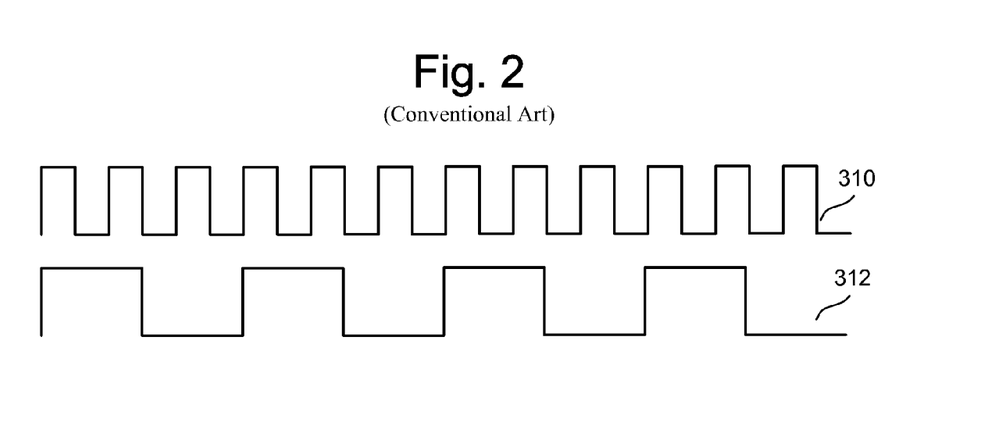
FIG. 2 depicts two waveforms that are used to explain the function of a divider.

The dividers 204, 206 and 208 divide the frequency of the signal they receive. FIG. 2 provides an example of an input signal 310 that enters a divider, which divides by 3, and a signal 312 that is the output of that divider. The signal 312 has a frequency that is one third of the frequency of signal 310. If, for example, signal 310 is the input to divider 204 and F=3, then signal 312 would be the output of divider 204.

When f1=f2 (with regard to the PLL of FIG. 1), the frequency of the output of divider 204 is equal to the frequency of the output of divider 206, and:

$$\frac{In}{F} = \frac{VCO}{B}$$

and $$Out = \frac{VCO}{O},$$

where In is the frequency of the input signal, Out is the frequency of the output signal, and B, F, O are the divider parameters for the PLL. The equations can be solved for Out:

$$Out = \frac{B(IN)}{F(O)}$$

Thus, Out is a function of In, determined by the PLL ratio B/(FO). A designer can, therefore, design a PLL to provide a certain output frequency in light of a particular input frequency by choosing the appropriate divider parameters B, F and O. Unfortunately, not all PLLs can provide a reasonable output waveform for every combination of divider parameters. Such limitations are due to device characteristics, and vary among different designs. As a general rule, the higher the integers in the numerator and the denominator of the PLL ratio, the poorer the quality of the resulting PLL output. For example, a PLL with a ratio of 6/1 should be easier and cheaper to make than a PLL that has a ratio of 1001/167.

Audio/video streams usually include an exact relationship between the number of audio samples encoded per unit of time and the number of images to be displayed. For example, a DVD transport stream may have a 48 kHz audio sample rate along with a (60/1.001) Hz video refresh rate. Thus, it is usually recommended that the audio and video clocks be generated from the same clock reference so that the ratio between the two clocks remains constant and drift between the audio and video clocks is avoided. However, because it may not be possible to implement every combination of divider parameters it is difficult to recreate both the exact audio clock and the exact video clock from the same clock source using some PLLs.

Because video data is conveniently grouped into frames, it has been easier to adjust video than audio. Therefore, typical designs include a source clock and PLL that exactly recreates the audio clock used for encoding. However, most reasonable cost PLLs in such systems cannot recreate the exact video clock that was used for encoding. Thus, over time, the playback application must add or drop frames (or audio samples) to maintain audio/video synchronization. This can be noticeable to the consumer.

Thus, there is a need to better synchronize video with the audio.

SUMMARY OF THE INVENTION

The synchronization of the video to the audio is resolved by adjusting one or more parameters of the video being recreated. Adjusting such variables allows for a change of the output frequency of the PLL to a value that can be implemented with divider parameters that result in a sufficiently high quality signal.

Typical video is divided into horizontal lines. Each line has a number of pixels of data. The output signal of the PLL can be referred to as a pixel clock, because it is used (in some form) by various components to operate on the pixels of a video signal. The pixel clock is a product of the number of pixels per line, the number of lines per frame (or field or other unit) and the required refresh rate (frame rate).

When a playback system connects to a monitor (or other output device), the system will calculate the pixel clock for the monitor's resolution (e.g., number of pixels per line, the number of lines per frame, etc.) and refresh rate. A determination can be made as to whether that pixel clock can be implemented with the PLL, given the input clock. If not, a mechanism is used to vary the video parameters, such as, for example, number of pixels per line or the number of lines per frame, in order to obtain a pixel clock that can be better implemented by the PLL. For example, the number of pixels per line and/or the number of lines per frame can be adjusted to lower the integers of the denominator and/or numerator of the PLL fraction.

In one embodiment, the varying of the video parameters causes an adjustment of the horizontal blanking width or vertical blanking height, without effecting the height and width of the visible ("active") video region. That is, the number of lines in the active video region is not changed and the number of pixels per line in the active video region is not changed.

In one example, the process of appropriately configuring the clock generation circuit to maintain synchronization of the video includes accessing an indication of a video rate and first set of one or more dimensions (e.g., pixels per line and lines per frame). The video rate and the first set of one or more dimensions correspond to a first pixel clock rate to be used by video processing circuits. A PLL receives an input clock signal and creates an output clock from the input clock based on the PLL parameters programmed into the PLL dividers. The output clock has a frequency equal to a second pixel clock rate that is based on the changed dimensions, which are different from the first set of dimensions.

In one example implementation, these processes can be performed using a PLL and a control circuit. The control circuit can includes one or many of the components described herein. The PLL includes a set of one or more programmable dividers. The control circuit is in communication with the dividers. The control circuit accesses a selection of a video rate and a first set of one or more dimensions. The video rate and the first set of one or more dimensions correspond to a first pixel clock rate. In response to the accessed selection of the video rate and the first set of dimensions, the control circuit programs the dividers to create a pixel clock at a second pixel clock rate based on a different set of dimensions.

DETAILED DESCRIPTION

Figure 3:
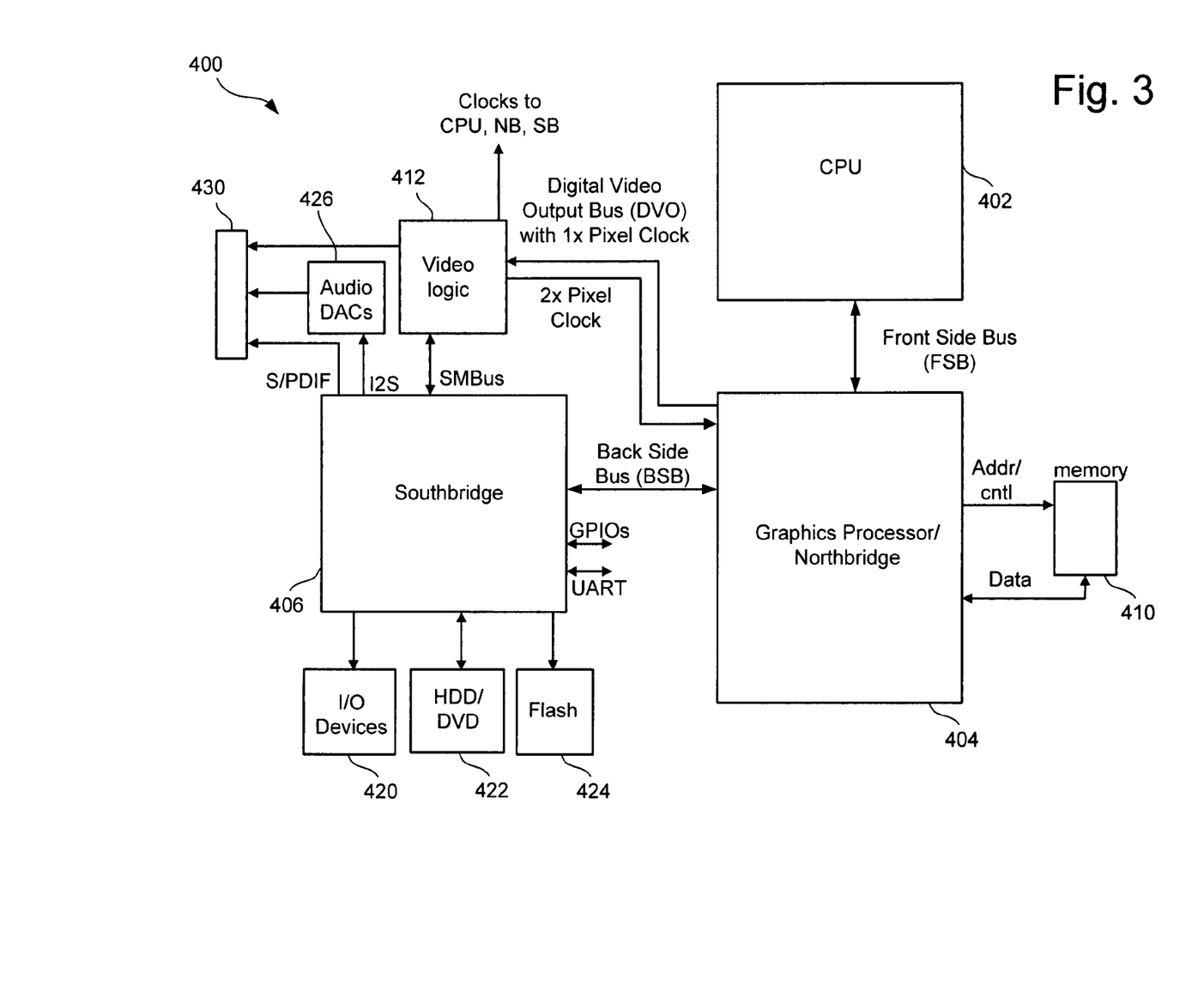
FIG. 3 is a block diagram of one example of a system that provides audio and video.

Synchronization of the video to is performed by adjusting one or more of the video parameters that define the video. For example, changing the dimensions (or other variables) of the video allows for an adjustment of the output frequency of the PLL to a value that can be implemented. In one embodiment, the varying of the video parameters causes an adjustment of the horizontal blanking width or vertical blanking height, without effecting the number of lines in the active video region and the number of pixels per line in the active video region FIG. 3 provides one example of a computing system 400 that outputs audio and video. The depicted system can utilize the synchronization scheme described herein, which includes changing one or more of the dimensions that define the video. One example of such a computing device can be a game device for providing multimedia experiences and playing video games. However, system 400 can also be used as a set top box, audio/video player (e.g., DVD player), personal computer, etc.

System 400 includes a Central Processing Unit (CPU) 402, a graphics processor (also called a Northbridge) 404 and a Southbridge 406. CPU 402 and Northbridge 404 communicate with each other via a Front Side Bus (FSB). Northbridge 404 communicates with memory 410 via address/control lines (Addr/cntl) and data lines (Data). Northbridge is used to provide graphics processing functions, provide memory functions, and serve as an intermediary between CPU 402 and Southbridge 406.

Northbridge 404 communicates with Southbridge 406 via a Backside Bus (BSB). Southbridge 406 performs various I/O functions, audio processing and testing functions. Southbridge 406 is in communication with I/O devices 420 (e.g., network interface), hard disc drives and DVD drives 422, and flash memory 424. System 400 also includes video logic 412. Northbridge 404 communicates with video logic 412 via a Digital Video Output Bus (DVO). Video logic 412 includes clock generation circuits which provide clocks to CPU 402, Northbridge 404 and Southbridge 406.

As discussed above, Southbridge 406 provides various audio processing. Southbridge communicates with digital to analog converters 426 via an I2S Bus. I2S is a standard digital audio chip-to-chip unidirectional interface. In its basic form, it consists of a sample clock (SCLK), a master clock (MCLK), a left/right indicator (LRSEL), and a data line. An interface 430 is included for connecting system 400 to components outside the system. Southbridge 406 is connected to interface 430 directly. In addition, digital analog converters 426 and video logic 412 are also connected to interface 430.

Figure 4:
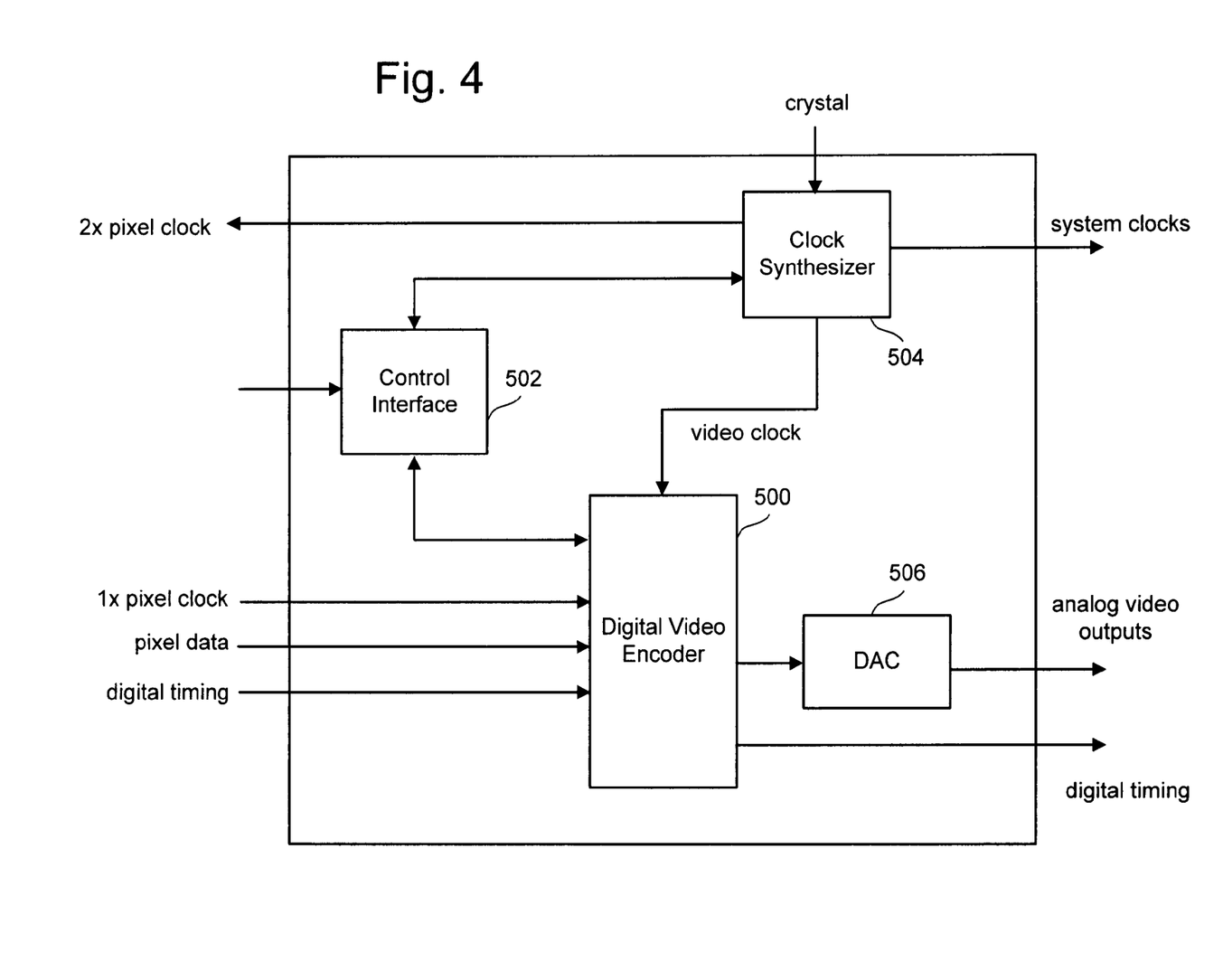
FIG. 4 is a block diagram depicting more detail of the video logic block depicted in FIG. 3.

FIG. 4 is a block diagram depicting more details of some of the components of video logic 412. FIG. 4 shows Digital Video Encoder 500, Control Interface 502, Clock Synthesizer 504 and Digital to Analog Converters 506. Digital Video Encoder 500 is used to perform video processing. For example, Digital Video Encoder 500 will receive a video stream from Northbridge 404 and package that stream in the appropriate format. The video may be from a DVD, network, etc., via Southbridge 406. The output video from Digital Video Encoder 500 will be sent to the Digital to Analog Converters 506 for creating the analog signal, which is then provided to the interface 430 (see FIG. 3).

Clock Synthesizer 504 is used to generate various clocks used by the system of FIG. 3. In one embodiment, Clock Synthesizer 504 will include a set of PLLs which generate various clock signals. These PLLs will receive an input clock from a crystal. In one example, the input clock has a frequency of 27 MHz. Other input clock frequencies can also be used. One of the PLLs inside Clock Synthesizer 504 will be used to generate a pixel clock (also called a 1x pixel clock). Another PLL will be used to generate a 2x pixel clock. Another PLL will be used to generate a video clock which is a multiple of the pixel clock, for example, 1-12x of the pixel clock. The 2x pixel clock is provided from Clock Synthesizer 504 to Northbridge 404. This 2x pixel clock is used to clock the interface between the Northbridge 404 and Digital Video Encoder 500. In response to this 2x pixel clock, pixel data and various digital timing information is provided to Digital Video Encoder 500 from Northbridge 404. The Northbridge also provides the 1x pixel clock to Digital Video Encoder 500. The video clock is used to over sample the video signal for the digital to analog conversion and for various other video processing techniques. In one embodiment, the 1x pixel clock isn't explicitly generated. Rather, a strobe signal is generated based on the oversampled video clock (1x-12x pixel rate) that is a stream of 1 cycle wide pulses that occur every N video clock cycles where N is the oversampling factor.

Figure 5:
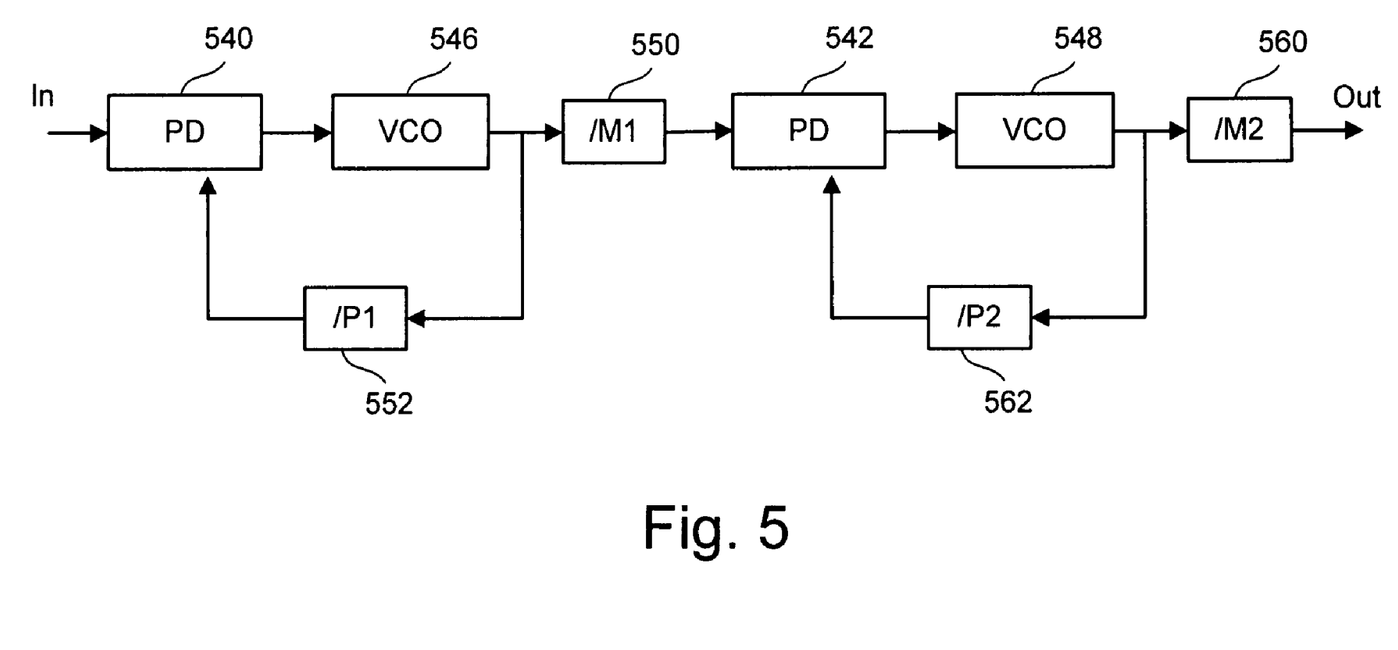
FIG. 5 is a block diagram of one embodiment of a PLL circuit.

FIG. 5 provides an example of a PLL used inside Clock Synthesizer 504. This PLL can be used to generate the 1x pixel clock, the 2x pixel clock or the video clock (1-12x pixel clock). The discussion herein for generating the pixel clock (including changing various video parameters) applies equally to the PLL for generating the 1x pixel clock, 2x pixel clock or video clock.

The PLL of FIG. 5 includes two PLLs cascaded together to form one composite PLL. The technology described herein can work with a single PLL, or a composite PLL of two or more PLLs connected together. The PLL of FIG. 5 includes a first phase detector 540 and a second phase detector 542. The PLL also includes a first VCO 546 and a second VCO 548. The output of VCO 546 is sent to divider 550 and divider 552. Divider 550 divides the frequency at the output of VCO 546 by divider parameter M1. Divider 552 divides the output frequency from VCO 546 by divider parameter P1. The output of divider 552 is fed back to phase detector 540. The output of divider 550 is provided to phase detector 542. The output of phase detector 542 is sent to VCO 548. The output of VCO 548 is provided to divider 560 and divider 562. Divider 562 divides the output of VCO 548 by divider parameter P2. The output of divider 552 is provided to phase detector 542. Divider 560 divides the output of VCO 548 by divider parameter M2. The output of divider 560 is the output of the PLL of FIG. 5. The dividers are frequency dividers, as explained above. The output function for describing the PLL of FIG. 5 is provided as follows:

$$\text{Out} = \text{In}\left(\frac{M1+1}{P1+1}\right)\left(\frac{M2+1}{P2+1}\right)$$

Notice that in the equation above, each of the divider parameters are depicted with "+1." In one embodiment, the divider circuits are implemented using counters. Because counters start at zero, the count to the parameter takes an additional count. For example, a count to four takes five steps (0, 1, 2, 3, 4). Thus, the "+1" is added to the parameters when expressing the PLL ratio. The two fractions on the right of the equation combine to from one fraction for the PLL ratio.

In one embodiment, each of the dividers 550, 552, 560 and 562 are programmable so the divider parameters can be changed. In one implementation, control interface 502 includes a set of registers. There would be one register for each divider parameter. Clock Synthesizer 504 can read the registers to set the appropriate counters. Northbridge 404 can write to the registers in Control Interface 502 using a SMBus.

The SMBus is a system management bus defined by Intel Corporation. The SMBus is typically used in personal computers and servers for system management communications. The SMBus is a two wire interface in which various system components can communicate with each other and with the rest of the system, and is based on the principal operations of I²C. Note that I²C is a bidirectional Control Interface that consists of a clock and a data line. The SMBus typically provides a control bus for system and power management related tasks. A system may use the SMBus to pass messages to and from devices instead of using individual control lines. Removing the individual control lines reduces pin count. Thus, a host off chip (e.g., the Northbridge), can use the SMBus to access the registers stored in Control Interface 502. In other embodiments, CPU 402 can access the registers of Control Interface 502 directly via the SMBus or indirectly via Northbridge 404. Thus, software running on the CPU 402 or Northbridge 404 can program the various PLLs by writing to the registers in Control Interface 502.

Typical video is divided into horizontal lines. Each line has a number of pixels of data. The output signal of the PLL (Out) can be referred to as a pixel clock (e.g. 1x pixel clock, 2x pixel clock, video clock, or other clock) because it is used, (in some form) by various components to operate on the pixels of the video signal. The pixel clocks are typically defined as the product of the number of pixels per line, the number of lines per frame (or other field or other unit) and the required refresh rate (frame rate). A PLL of reasonable cost implemented as depicted in FIG. 5 cannot implement every combination of the divider parameters. Therefore, for a given input frequency, not every pixel clock rate can be generated for a given input frequency.

When the system of FIG. 5 connects to a monitor (or other output device), or otherwise changes (or establishes) the output video specifications, the system will calculate the pixel clock for the particular desired resolution (e.g., number of pixels per line, number of lines per frame, etc.) and refresh rate. A determination can then be made as to whether that pixel clock can be implemented with the PLL of FIG. 5, given the input clock of 27 MHz. If not, a mechanism is used to vary the video parameters, such as, for example, the number of pixels per line or the number of lines per frame, in order to obtain a pixel clock that can be better implemented by the PLL of FIG. 5.

For example, for VGA mode that supports 640 active (i.e., visible) pixels per line, 480 active lines per frame, and a frame rate of 60/1.001 Hz (59.94 Hz), the VESA standards body suggests video dimensions that include 800 pixels per line (including active region and horizontal blanking) and 525 lines per frame (including active region and vertical blanking). The horizontal blanking includes the time it takes for the monitor to trace from the end of one line to the beginning of the next line. Certain pixels are part of the horizontal blanking. The vertical blanking is the time needed for the monitor to trace from the last pixel of the bottom line to the first pixel of the top line. Additional lines are for the vertical blanking. The above dimensions (800×525) and frame rate (59.94 Hz) result in a pixel clock rate of (800 pixels/line) (525 lines/frame) (60/1.001 frames/second)= 25.174825174825174825174825174825 . . . MHz. If the PLL of FIG. 5 generating that pixel clock is using a 27 MHz input clock, the PLL ratio required is 400/429. Unfortunately, this ratio may not easily be achievable by a conventional PLL. However, if the horizontal timing is slightly altered such that a total of 806 pixels per line (including horizontal blanking) are used instead of 800, the desired pixel clock rate would be (806)(525)(60/1.001)= 25.363636 . . . MHz, which works out to a PLL ratio of 31/33 for a 27 MHz input clock. This PLL ratio is much easier to achieve. Similarly, instead of adjusting the horizontal timing, the vertical timing could also be adjusted. With the adjustment of the horizontal or vertical timing, and the resulting adjustment of the pixel clock, the Digital Video Encoder can achieve the appropriate refresh rate with the existing PLL and input source clock. Thus, the video would be sufficiently synchronized to the audio such that no frames need to be added or dropped.

Figure 6:
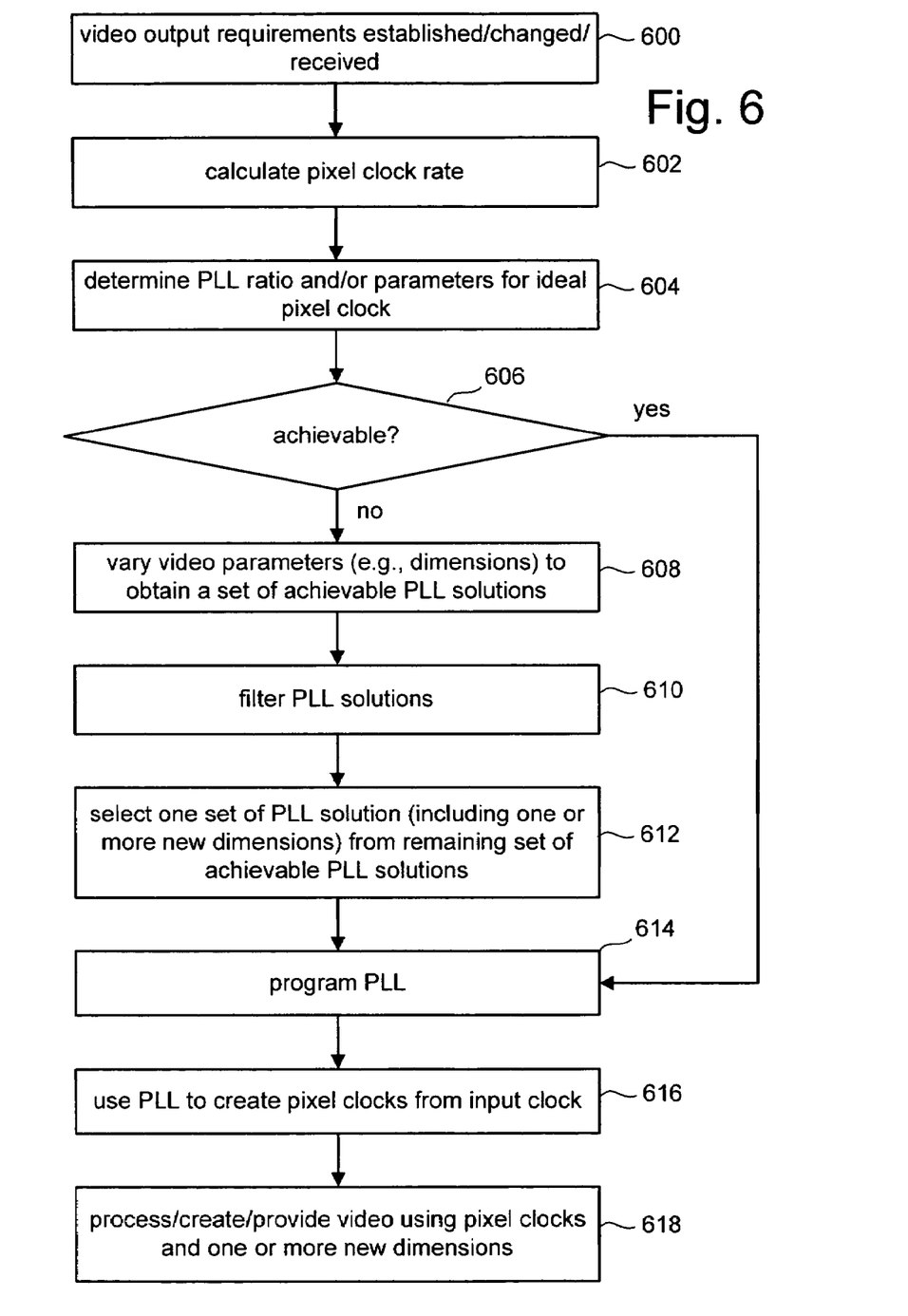
FIG. 6 is a flow chart describing one embodiment of a process for synchronizing video.

FIG. 6 is a flowchart describing one embodiment of a process for synchronizing video by adjusting one or more of the video parameters as discussed above. In step 600, video output requirements for the system of FIG. 3 are established, changed or otherwise received. For example, the system may be connected to a monitor. Some monitors can indicate the desired refresh rate and resolution. Alternatively, the user may select a different output resolution or different output device. The information can also be read from a storage device within the system. There are various other means for accessing output requirements of the video. Typically, the output requirements will include a refresh rate and resolution. Resolution can include pixels per line and lines per frame. Note that throughout this discussion, the term "frame" is used to identify the unit of an image. However, the invention is not limited to a frame, a field or any other unit of an image.

In step 602, the pixel clock rate is calculated. As discussed above, the pixel clock rate can be calculated from multiplying the pixels per line by the lines per frame and the frame rate. In some embodiments, step 602 can be optional because various pixel clock rates can be pre-calculated in advance and stored in a data structure. In step 604, the system will determine the PLL parameters for the ideal pixel clock rate calculated in step 602, given the 27 MHz input clock. Note that in other embodiments, other input clock rates can be used. By dividing the output clock by the input clock, the PLL ratio can be determined. Various combinations of PLL parameters (e.g., M1, M2, P1, P2) can be used to obtain the desired PLL ratio. In step 606, it is determined whether the particular PLL parameters, PLL ratio, or pixel clock rate are achievable. In one embodiment, the PLL design will include various restrictions on the parameters and/or operation of the PLL. For example, one implementation may require that the parameters all be less than 20. In another embodiment, step 606 could include determining whether the pixel clock is achievable with any set of parameters. In that embodiment, it is possible to skip step 604. In another embodiment, the test of step 606 involves determining whether the solution is acceptable in light of various factors such as quality of signal, video clock jitter, power consumption, EMI, noise cross coupling, etc There are various ways to perform step 606. For example, a function can be written in software to test a particular pixel clock rate, PLL ratio, and/or set of parameters and return a binary value of achievable/unachievable. Alternatively, software (or other means) can be used to generate all achievable pixel clocks and/or all achievable sets of PLL parameters. These achievable solutions can be stored in a look-up table or other data structure. In that case, the testing of step 606 will include looking up whether the particular pixel clock, PLL ratio and/or parameters are stored in the data structure.

One example of a set of restrictions that can be used to determine what is and is not achievable for the PLL of FIG. 5 includes the following restrictions:

1. M1, M2 and P1 cannot be 0 or 32;
2. P2 cannot have the values 64, 65 or 66;
3. In(M1+1) and (In(M1+1)(M2+1))/(P1+1) must be greater than 520 MHz and less than 1040 MHz;
4. In case several rules meet the previous restrictions, (In(M1+1)/(P1+1))*(In(M1+1)(M2+1))/(P1+1) must be as close to 62,500 as possible; and
5. In the case where all previous rules pass and rule three generates the same value, (In(M1+1))+((In(M1+1)(M2+1))/(P1+1)) should be minimal.

Another set of restrictions for determining whether a particular set of parameters is achievable with the PLL of FIG. 5 includes the following:

1. VCO 546 (VCO1) and VCO 548 (VCO2) have output frequencies in the range of 520-1040 Hz;
2. M1 is between 1 and 64, but not 33;
3. P1 is between 2 and 32;
4. M2 is between 2 and 32;
5. P2 is between 2 and 128; however, P2 is not 65, 66 or 67;
6. The input to PD542 (PD2) is between 50-100 Hz; and
7. PD2*VCO 2 is in the range of 26000-104000 Hz (with a narrower range being better).

At the end of this specification is a set of computer code written in the C programming language. This computer code uses the above-listed seven rules to provide a list of all achievable output frequencies of the PLL of FIG. 5 for an input of 27 MHz. For each allowable frequency, there can be multiple combinations of the parameters M1, M2, P1 and P2 that can provide the resulting allowable pixel clock frequency. In one embodiment, selecting the best combination of parameters involves optimizing how the rules are satisfied and/or optimizing device behavior. For example, rule seven may be optimized by selecting the data sample that has a value P2 (VCO2) closest to the middle of the range. The output of the code below can be sorted as a post processing step to allow easy reference. Then, unused parameter settings (where multiple parameter settings can be used to achieve the same pixel clock rate, only a chosen set of parameters are kept) are discarded. The results of the sorting and discarding can be stored in the table accessible by CPU 402.

In an embodiment using the C code below, determining whether a particular pixel rate is achievable in step 606 includes identifying whether the pixel rate is listed in the output of the C code. The output (e.g. a table) will include the pixel rate if it is achievable and will not include the pixel rate if it is not achievable. If the pixel rate is achievable, the table will also include the selected PLL parameter values (M1, M2, P1, P2) for that pixel rate. If the pixel rate is achievable, then the PLL parameters will be programmed into the appropriate PLL in step 614 by storing the appropriate data for the PLL parameters and then to the registers in Control Interface 502.

If the pixel rate, parameters and/or PLL ratio are not achievable, then one or more of the video parameters (e.g., pixels per line, lines per image) will be varied to obtain a set of achievable solutions in step 608. In step 610, the set of achievable solutions is filtered. For example, if the numerator or denominator of the PLL ratio for any of the achievable PLL solutions is larger than the ideal denominator and numerator (the numerator and denominator for the PLL ratio associated with the pixel rate determined in step 602), then those solutions are discarded. Note that step 610 is optional. In step 612, one of the remaining achievable solutions is selected according to any one of various suitable methods. The chosen PLL solution will include a particular PLL ratio. In some embodiments, the chosen solution will also include the optimal parameter values for obtaining that ratio. In other embodiments, a software process calculates a set of parameters to achieve that ratio. In step 614, the PLL is programmed, as discussed above. In one embodiment, steps 600-614 are performed by software programming CPU 402.

In step 616, the PLL creates the pixel clock from the input clock using the dividers programmed with the appropriate parameters. In step 618, Digital Video Encoder 500 and Digital to Analog Converter 506 will be used in conjunction with the various pixel clocks created by the method described above to process, create or otherwise provide video according to the new dimensions. Remember that step 612 included varying one or more of the dimensions (pixels per line or lines per frame). Thus, in step 618 when the video is provided on the output of the device of FIG. 3, the video is provided with the new dimensions associated with the solution chosen in step 612. This video is received at the Digital Video Encoder from a DVD, a network or other source via the Northbridge, and then processed or changed by the video encoder to alter the dimensions. For example, Digital Video Encoder may have to add additional pixels for each line. Thus, the image may be squeezed a little smaller to fit the data. In other situations pixels may be removed, lines may be added and/or lines may be removed. In one embodiment, pixels and lines are added to or removed from the blanking intervals (e.g., horizontal and/or vertical). For example, the width of the horizontal blanking region is changed and/or the height of the vertical blanking region is changed, If pixels are removed from each line, then the viewable image may be enlarged. Similarly, if additional lines are added to each frame, the video may be squeezed smaller. If lines of video are removed from each frame, the image may be enlarged and data may be lost (e.g. from the lost lines) or the blanking interval shortened. In other embodiments, pixels and lines are added to or removed from the active areas.

In one embodiment, all of the steps of FIG. 6 are performed automatically (e.g., without human intervention). In other embodiments, apportion of the process is performed with one or more manual steps.

Figure 7:
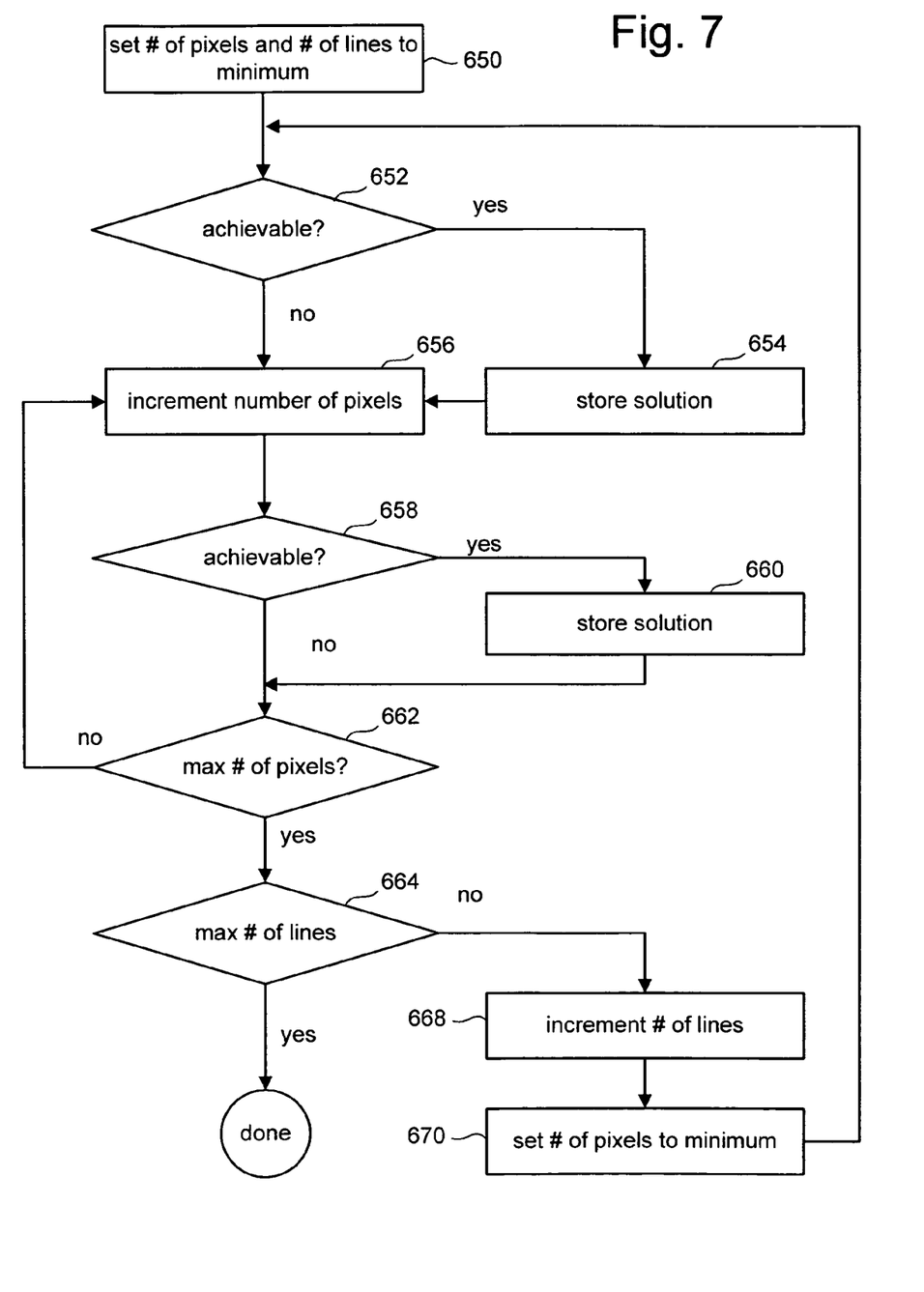
FIG. 7 is a flow chart describing one embodiment of a process for determining a set of achievable solutions for a PLL circuit.

FIG. 7 is a flowchart describing more details of the process of varying video parameters to obtain a set of achievable PLL solutions (see step 608 of FIG. 6). In step 650, the number of pixels per line and the number of lines per frame are set to a minimum number for the range of variance. That is, the process of FIG. 7 will vary the number of pixels per line and the number of lines per frame within a predefined range (the range of variance). In some embodiments, the predefined range could include +/–5%-10% of the standard dimension. In other embodiments absolute values can be used (e.g., +/–10-20 pixels, +/–10-20 lines). In the example of +/–10 lines and +/–10 pixels, step 650 includes setting the number of pixels to 10 pixels below the standard dimension (e.g. 790) and 10 lines below the standard dimension (e.g. 515). These values are the minimum values of the range of variance. In step 652, it is determined whether these new dimensions provide for an achievable solution for the PLL. That is, the pixel clock rate is recalculated with the new dimensions and it is determined whether the PLL can achieve that pixel clock rate, as discussed above. If so, then the particular solution is stored in step 654. After storing the solution, the number of pixels is incremented by one in step 656. Note that, if in step 652, it is determined that the particular solution was not achievable, then the process moves directly to step 656. After incrementing the number of pixels, it is determined whether this new solution is achievable in step 658. If the new solution is achievable, then the solution is stored in step 660 and the system determines whether the number of pixels being considered is the maximum number of pixels for the range of variance (step 662). Note that, if in step 658, it is determined that the particular solution is not achievable, the process moves directly to step 662.

If the number of pixels being considered is not the maximum amount of pixels for the range of variance, then the process loops back to step 656 and increments the number of pixels. If the number of pixels is at the maximum number of the range (e.g., 810), then the process in step 664 determines whether the maximum number of lines is being considered. For example, if the standard number of lines is 525 and the last solution considered included 535 lines, then the process of FIG. 7 is completed. Otherwise, the process continues at step 668 and increments the number of lines. In step 670, the number of pixels is set back to the minimum for the range of variance (e.g., 790) and the process loops back to step 652. Using the process of FIG. 7, the system iterates for all the possibilities of pixels per line and lines per frame, within the range of variance, to determine all the possible pixel clock rates that can be achieved by the PLL.

Figure 8:
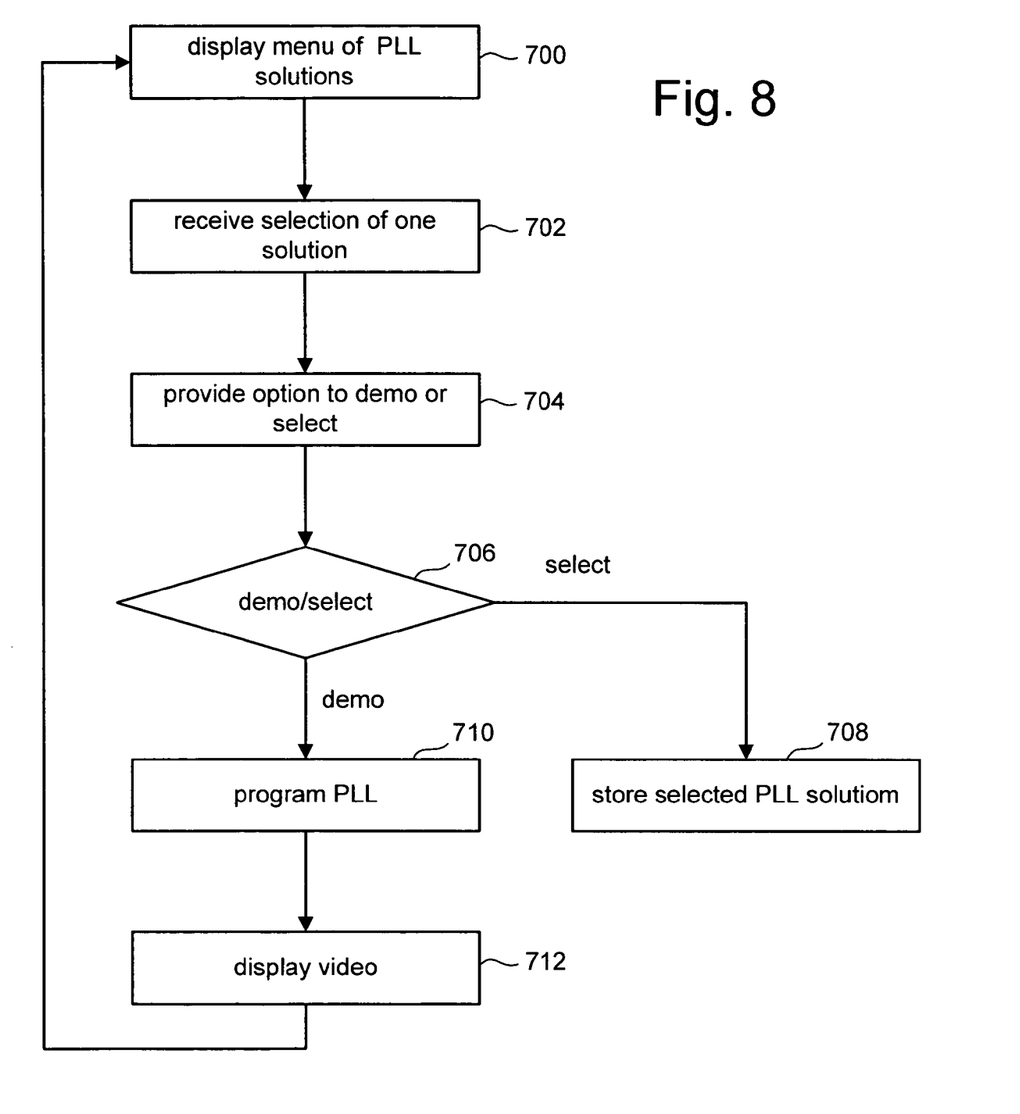
FIG. 8 is a flow chart describing one embodiment of a process for selecting an achievable solution for a PLL circuit.

FIG. 8 is a flowchart describing one example of a process for selecting one of the PLL solutions (step 612 of FIG. 6). Note that the process of FIG. 8 is performed manually with the system of FIG. 3 connected to a monitor (or other output device). In step 700, a menu is displayed on the monitor. The menu includes a set of symbols for each of the various achievable PLL solutions. The menu can list the solutions by clock rate, by dimensions (horizontal and vertical) or by using other indicia. In step 702, the user can select one of the solutions by using a pointing device or other means. In step 704, an option is provided to the user to demonstrate the selected solution or to actually select that solution for use. In step 706, the user chooses whether to demonstrate or select for use. If the user chooses to select the solution for use, that PLL solution is stored for use in step 614 of FIG. 6. If the user chooses to demonstrate the solution, then in step 710 the PLL is programmed with the parameters of that particular solution and in step 712 a sample image is displayed. The sample image is displayed at the dimensions of the chosen solution, with the video processing circuitry using a pixel clock from the PLL programmed with the parameters of the solution. Thus, the user will see how the horizontal and vertical dimensions of the particular solution affect the video. The image displayed can be a test image or part of the actual video. After step 712, the process continues at step 700. Alternatively, the process can loop back to other steps in FIG. 8. In one embodiment, step 712 is performed for a pre-set period of time or until the user performs an action with one or more input devices (e.g., clicks on a mouse, touches a key, etc.).

Figure 9:
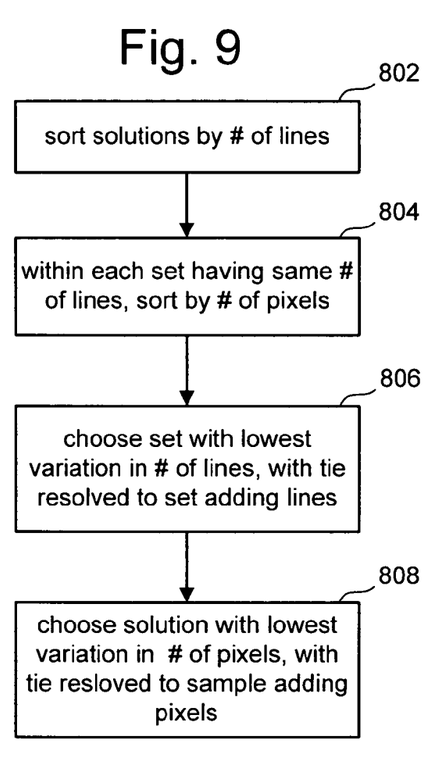
FIG. 9 is a flow chart describing one embodiment of a process for selecting an achievable solution for a PLL circuit.

FIG. 9 is a flowchart describing another embodiment for selecting a solution (step 612 of FIG. 6). In step 802, all of the solutions identified in step 608 that passed the filter of step 610 are sorted by the number of lines per frame. Note that there is a chance that there may be more than one solution for each number of lines per frame. Thus, in step 804, within each set of solutions having the same number of lines per frame, the solutions are sorted by number of pixels. In step 806, the process will choose the set of solutions that have the lowest variation in number of lines per frame. If there are two sets (with a positive and negative variation in lines), the tie will be resolved by choosing the set of solutions that adds lines. In step 808, within that chosen set, one solution will be chosen that has the smallest variation in number of pixels. If two solutions within that set have the same variance of pixels, the solution that adds pixels (opposed to substracting pixels) will be chosen.

For example, consider a list of solutions that, after step 802, are sorted as follows:

| solution | lines | pixels | clock rate |
|---|---|---|---|
| 1 | 520 | 804 | A |
| 2 | 520 | 797 | B |
| 3 | 522 | 808 | C |
| 4 | 522 | 810 | D |
| 5 | 523 | 800 | E |
| 6 | 523 | 792 | F |
| 7 | 527 | 801 | G |
| 8 | 527 | 802 | H |
| 9 | 527 | 809 | I |
| 10 | 529 | 795 | J |

After step 804, the list will be sorted as follows:

| solution | lines | pixels | clock rate |
|---|---|---|---|
| 1 | 520 | 797 | B |
| 2 | 520 | 804 | A |
| 3 | 522 | 808 | C |
| 4 | 522 | 810 | D |
| 5 | 523 | 792 | F |
| 6 | 523 | 800 | E |
| 7 | 527 | 801 | G |
| 8 | 527 | 802 | H |
| 9 | 527 | 809 | J |
| 10 | 529 | 795 | I |

After step 806, the following sets of solutions will be chosen:

| solution | lines | pixels | clock rate |
|---|---|---|---|
| 7 | 527 | 801 | G |
| 8 | 527 | 802 | H |
| 9 | 527 | 809 | J |

After step 808, the following solution is chosen:

| solution | lines | pixels | clock rate |
|---|---|---|---|
| 7 | 527 | 801 | G |

Variations of the process of FIG. 9 include using weight to give more preference to adding lines and pixels rather than subtracting. For example, subtracting one pixel can be given the same weight as adding three pixels; therefore, adding two pixels will be chosen over subtracting one pixel. Similarly, subtracting one line can be given the same weight as adding multiple lines.

Figure 10:
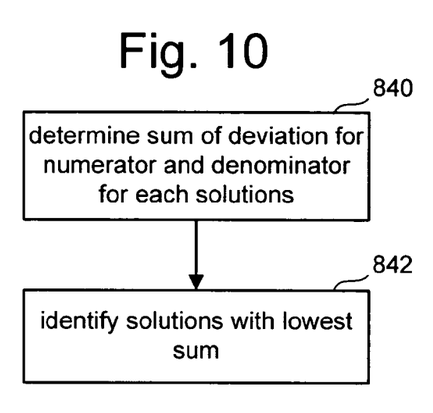
FIG. 10 is a flow chart describing one embodiment of a process for selecting an achievable solution for a PLL circuit.

FIG. 10 provides an alternate embodiment for choosing a solution (step 612 of FIG. 6). In step 840, the system can access all of the PLL ratios for all of the solutions remaining. In step 840, the system will determine the sum of deviations for the numerators and denominators for each solution as compared to the PLL ratio of an ideal solution for the ideal pixel clock calculated in step 602 of FIG. 6. In step 842, the solution with the lowest sum will be chosen. In other variations, weighted sums can be calculated giving either the numerator, denominator, a positive variation, a negative variation, or other factor greater or less weight. Another option includes using mean squares instead of sums, as well as weighted mean squares. Note that, in some embodiments, the processes of FIGS. 9 and 10 can be performed in a fully automated fashion by software programming CPU 402, Northbridge 404 and/or one or more other devices. By automated, it is meant that no human intervention is necessary.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

COMPUTER CODE

```
/* clocks that can be generated by PLL */
#include <stdio.h>
#include <stdlib.h>
#include <math.h>
#define XTAL_FREQ   27
#define PD2_VCO2_MIDRANGE   ((100000.0 + 25000.0) / 2.0)
unsigned long gcd (unsigned long a, unsigned long b)
{
    unsigned long i, num, den, tmp;
    i = 1;
    num = a; den = b;
    if (num<den) {
        tmp = num;
        num = den;
        den = tmp;
    }
    while (i!=0) {
        i = num - (num/den)*den;
        if (i!=0) {
            num = den;
            den = i;
            i = 1;
        }
    }
    return den;
}
/*  VCO1 min 520 max 1040
    VCO2 min 520 max 1040
    P2 min 50 max 100
    VCO1 + VCO2 = power
    PD2*VCO2 min 26000 max 104000 narrower range is better
*/
int main (long argc, char **argv)
{
    int m1, p1, m2, p2;
    int vcomax, pdmax;
    double vco1, vco2, pd2;
    if (argc<3) {
        fprintf(stderr, "%s VCOmax PDmax\n" , argv[0]);
        exit(-1);
    }
    vcomax  = atoi(argv[1]);
    pdmax   = atoi(argv[2]);
    /* generate all combinations that the PLL can handle */
    /* first feedback divisor */
    for (m1=2; m1<=64; m1++) {
        /* keep first VCO within range using a 27 MHz input
*/
        if ((m1*XTAL_FREQ) < (vcomax/2)) continue;
        if ((m1*XTAL_FREQ) > vcomax) continue;
        if (m1==33) continue;    /* can't use this value */
        if (m1==65) continue;    /* can't use this value */
        if (m1==97) continue;    /* can't use this value */
        /* first output divisor */
        for (p1=2; p1<=32; p1++) {
```

-continued

COMPUTER CODE

```
        /* range to keep second phase detector BW within
range */
            if ((m1*XTAL_FREQ) < (pdmax*p1)/2) continue;
            if ((m1*XTAL_FREQ) > (pdmax*p1)) continue;
            /* second feedback divisor */
            for (m2=2; m2<=32; m2++) {
                /* range to keep second VCO within range */
                if ((m1*m2*XTAL_FREQ) < (vcomax*p1)/2)
                    continue;
                if ((m1*m2*XTAL_FREQ) > (vcomax*p1)) continue;
                /* final output divisor */
                for (p2=2; p2<=128; p2++) {
                    if (p2==65) continue;       /* can't use */
                    if (p2==66) continue;       /* can't use */
                    if (p2==67) continue;       /* can't use */
                    /* keep output within 24 to 270 MHz */
                    if ((m1*m2*XTAL_FREQ) < (24*p1*p2))
                        continue;
                    if ((m1*m2*XTAL_FREQ) > (270*p1*p2))
                        continue;
                    vco1 = XTAL_FREQ * m1;
                    pd2 = vco1 / p1;
                    vco2 = pd2 * m2;
                    fprintf(stdout, "%11.7lf, deltamid=%10.3lf,
vco1+2=%5.0lf, f= %3d / %3d (p2=%3d, m2=%2d, p1=%2d,
m1=%2d, vco1=%4.1lf, pd2=%4.1lf, vco2=%6.1lf,
pd2*vco2=%6.0lf, reg=0x%X)\n", (vco2 / p2) − .0000000495,
/* .00000005 is to reverse the affects of rounding -- I
want truncation! */
                        fabs( (pd2 * vco2) −
                        PD2_VCO2_MIDRANGE ),
                        vco1 + vco2,
                        (m1*m2)/gcd(m1*m2, p1*p2)),
                        ((p1*p2)/gcd(m1*m2, p1*p2)),
                        p2−1, m2−1, p1−1, m1−1,
                        vco1, pd2, vco2, pd2 * vco2,
                        ((p2−1) << 16) | ((m2−1) << 11) | ((p1−1)
                        << 6) | (m1−1) );
                }
            }
        }
    }
    return 0;
}
```

I claim:

1. A method for configuring a clock generation circuit, comprising:
accessing an indication of a video rate and first set of one or more dimensions, said video rate and said first set of one or more dimensions correspond to a first pixel clock rate;
receiving an input clock signal at a phase locked loop circuit;
creating an output clock having a second pixel clock rate based on said input clock signal and a second set of one or more dimensions in response to said indication;
receiving digitized video; and
changing video data for said digitized video in order to change said digitized video to be defined by said second set of dimensions, said changing video data includes at least one of changing an amount of pixels per line of said digitized video or changing an amount of lines in said digitized video.

2. A method according to claim 1, wherein:
said changing video data includes changing an amount of pixels per line of digitized video.

3. A method according to claim 2, wherein:
said changing an amount of pixels per line of digitized video includes changing a width of a horizontal blanking region.

4. A method according to claim 1, wherein:
said first set of one or more dimensions includes a first number of lines in said digitized video and a first number of pixels per line;
said first number of lines in said video includes active and blanking regions;
said first number of pixels per line includes active and blanking regions;
said changing video data includes changing said first number of lines in said digitized video.

5. A method according to claim 4, wherein:
said changing said first number of lines includes changing a height of a vertical blanking region.

6. A method according to claim 1, further comprising:
automatically determining that a phase locked loop circuit cannot create said output clock at said first pixel clock rate; and
automatically determining a change to make to one or more dimensions of said digitized video, said determining a change includes identifying said second set of dimensions.

7. A method according to claim 1, further comprising:
providing options for new dimensions of said digitized video; and
receiving a selection of one of said options, said one of said options corresponds to said second set of dimensions.

8. A method according to claim 1, further comprising:
providing options for new dimensions of said digitized video;
receiving a selection of a first option corresponding to said second set of dimensions;
displaying an image in accordance with said first option; and
receiving a request to change said digitized video in accordance with said first option, said request is received after said image is displayed.

9. A method according to claim 1, further comprising:
automatically determining that said phase locked loop circuit cannot create said output clock at said first pixel clock rate after accessing said indication, said creating an output is performed in response to said determining that said phase locked loop circuit cannot create said output clock at said first pixel clock rate, said creating an output is performed by said phase locked loop circuit.

10. A method according to claim 9, wherein said step of automatically determining that said phase locked loop circuit cannot create said output clock at said first pixel clock rate comprises:
accessing a look-up table of achievable modes for said phase locked loop circuit.

11. A method according to claim 1, further comprising:
identifying said second pixel clock rate and said second set of dimensions as achievable by a phase locked loop circuit creating said output clock;
identifying parameters for said phase locked loop circuit to achieve said second pixel clock rate; and
programming said phase locked loop circuit according to said parameters.

12. A method according to claim 1, further comprising:
calculating said first pixel clock rate;
determining that said first pixel clock rate is not achievable for using said first set of dimensions with a phase locked loop circuit to create said output clock;
determining a set of achievable configurations for said phase locked loop circuit; and choosing one of said achievable configurations, said chosen achievable configurations corresponds to said second set of dimensions.

13. A method according to claim 12, wherein:
said choosing one of said achievable configurations favors configurations that add video data to said video rather than subtract video data from said video.

14. A method according to claim 12, wherein:
said choosing one of said achievable configurations favors configurations that change a number of lines in said video rather than change a number of pixels per line for said video.

15. A method according to claim 1, further comprising:
calculating said first pixel clock rate;
accessing pre-stored data indicating allowed output clock rates, said accessing includes looking for data in said pre-stored data corresponding to said first pixel clock rate;
determining that said first pixel clock rate is not allowed; and
choosing said second pixel clock rate from said allowed output clock rates, said second pixel clock rate corresponds to said second set of dimensions.

16. A method according to claim 1, wherein:
said first set of one or more dimensions includes a value for pixels per line and a value for lines per frame.

17. A method according to claim 1, wherein:
said video rate is a refresh rate.

18. A method according to claim 1, wherein:
said indication of a video rate and first set of one or more dimensions is provided by a user.

19. A method according to claim 1, wherein:
said indication of a video rate and first set of one or more dimensions is provided by a monitor.

20. A method according to claim 1, wherein:
said indication of a video rate and first set of one or more dimensions is read from a storage device.

21. A method according to claim 1, wherein:
said output clock is a pixel clock.

22. A method according to claim 1, wherein:
said output clock is a 2x pixel clock.

23. A method according to claim 1, wherein:
said output clock is a 12x pixel clock.

24. A clock synthesis circuit, comprising:
a phase locked loop circuit including a set of one or more programmable dividers; and
a control circuit in communication with said one or more programmable dividers, said control circuit accesses a selection of a video rate and a first set of one or more dimensions, said video rate and said first set of one or more dimensions correspond to a first pixel clock rate, in response to said accessed selection of said video rate and said first set of dimensions said control circuit programs said programmable dividers to create a pixel clock at a second pixel clock rate based on a different set of one or more dimensions.

25. A clock synthesis circuit according to claim 24, wherein:
said control circuit includes a CPU, a Northbridge and an interface circuit.

26. A clock synthesis circuit according to claim 24, further comprising:
a video processing circuit, said video processing circuit receives input video and creates an output video signal according to said video rate and said different set of one or more dimensions.

27. A clock synthesis circuit according to claim 26, wherein:
said video processing circuit changes a number of lines in said input video in order to create said output video signal.

28. A clock synthesis circuit according to claim 26, wherein:
said video processing circuit changes a number of pixels per line in said input video in order to create said output video signal.

29. A clock synthesis circuit according to claim 24, wherein:
said first set of one or more dimensions includes a first number of lines in said video and a first number of pixels per line;
said first number of lines in said video includes active and blanking regions;
said first number of pixels per line includes active and blanking regions; and
said video processing circuit changes said first number of pixels per line by changing a width of a horizontal blanking region.

30. A clock synthesis circuit according to claim 24, wherein:
said control circuit includes a set of registers, said registers store values to control said dividers, said control circuit programs said dividers by loading data into said registers.

31. A clock synthesis circuit according to claim 24, wherein:
said control circuit automatically determines that said phase locked loop circuit cannot implement said first pixel clock rate and chooses said second pixel clock rate in response.

32. A clock synthesis circuit according to claim 24, wherein:
said control circuit determines that said phase locked loop circuit cannot implement said first pixel clock rate, determines a set of pixel clock rates that can be implemented using said phase locked loop circuit by varying one or more of said first set of dimensions, and chooses said second pixel clock rate from said set of pixel clock rates that can be implemented, said second pixel clock rate corresponds to said second set of one or more dimensions.

33. A method for configuring a clock generation circuit that includes a phase locked loop circuit, comprising:
accessing an indication of a video rate and first set of one or more dimensions, said video rate and said first set of one or more dimensions correspond to a first pixel clock rate;
determining that said first pixel clock rate should not be implemented using said phase locked loop circuit;
determining a set of pixel clock rates that can be implemented using said phase locked loop circuit by varying one or more of said first set of dimensions;
choosing a second pixel clock rate from said set of pixel clock rates that can be implemented, said second pixel clock rate corresponds to a second set of one or more dimensions; and
providing an output clock at said second pixel clock rate using said phase locked loop circuit based on said second set of dimensions.

34. A method according to claim 33, further comprising:
receiving first video; and
providing output video, based on said first video, defined by said second set of dimensions.

35. A method according to claim 34, wherein:
said step of providing output is performed without adding or removing frames.

36. A method according to claim 33, wherein:
said steps of accessing an indication, determining that said first pixel rate should not be implemented, determining a set of pixel clock rates and providing an output clock are performed automatically.

37. A method according to claim 33, wherein said step of choosing comprises:
providing options for new dimensions of video;
receiving a selection of a first option corresponding to said second set of dimensions;
displaying an image in accordance with said first option;
receiving a request to proceed said first option, said request is received after said image is displayed; and
automatically configuring output video to conform to said second set of dimensions in response to said request to proceed.

38. A method according to claim 33, wherein said choosing comprises:
automatically selecting said second pixel clock rate because said second pixel clock rate minimizes a change from said first pixel clock rate with respect to said set of pixel clock rates that can be implemented.

39. A method according to claim 33, wherein said determining that said first pixel clock rate should not be implemented using said phase locked loop circuit comprises:
comparing said first pixel clock rate to a pre-stored set of pixel clock rates.

* * * * *